April 5, 1960 R. HASKINS 2,932,023
AIRCRAFT COURSE DIRECTOR
Filed Aug. 4, 1955 2 Sheets-Sheet 1

INVENTOR
ROBERT HASKINS

BY Mead, Browne, Schuyler & Beveridge
ATTORNEYS

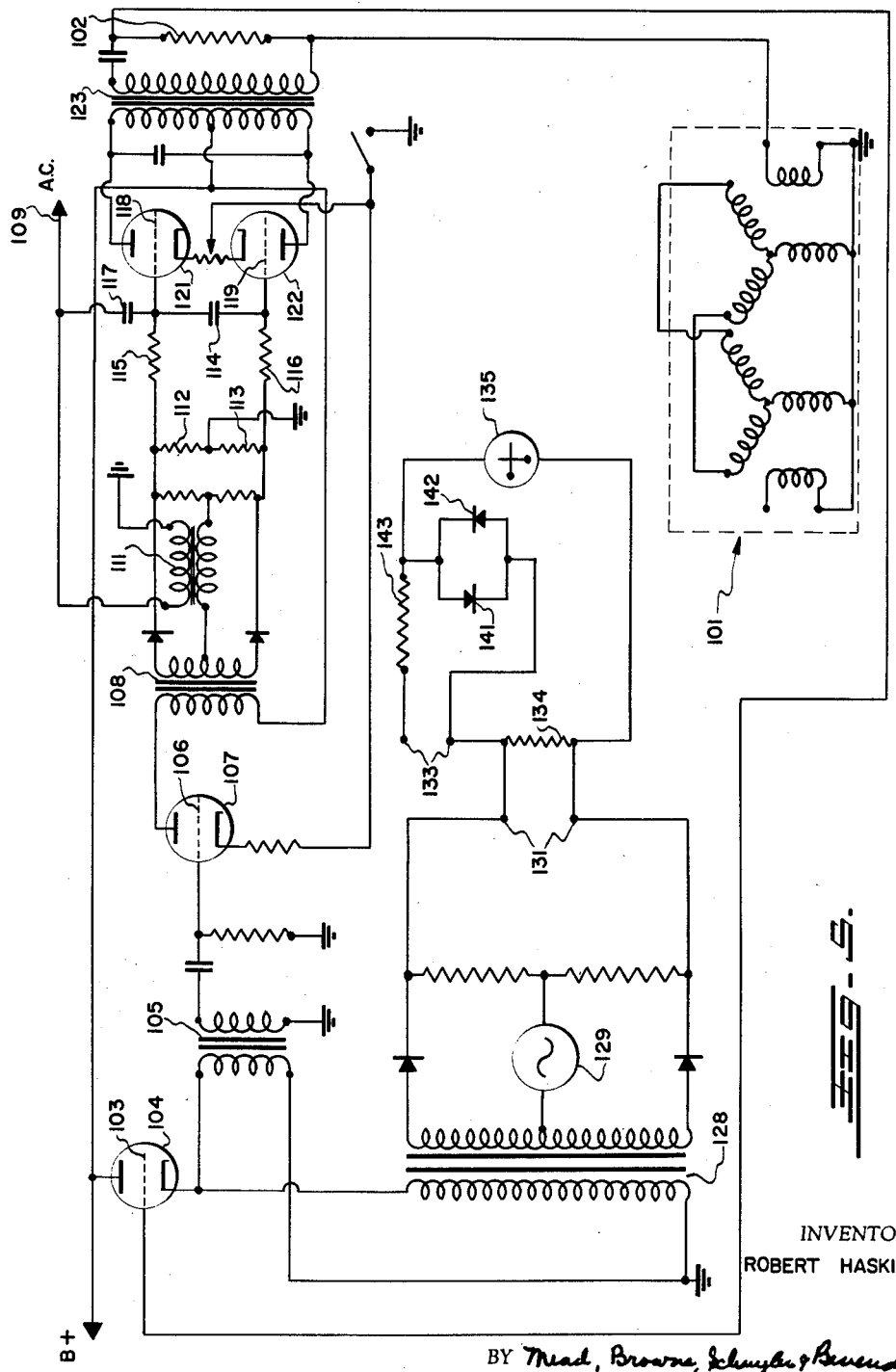

United States Patent Office 2,932,023
Patented Apr. 5, 1960

2,932,023

AIRCRAFT COURSE DIRECTOR

Robert Haskins, Richmond, Va., assignor, by mesne assignments, to Aircraft Radio Corporation (1958), Boonton, N.J., a corporation of New Jersey Application August 4, 1955, Serial No. 526,367

19 Claims. (Cl. 343—107)

This invention relates to a course director for aircraft and particularly concerns a course director for presenting a stabilized heading reference which will result in the most effective interception and subsequent tracking of a radio beam.

Difficulties experienced in flying a radio beam, such a omni or localizer beam, stem from the fact that the signals from the omni or localizer receiver indicate only the location of the airplane relative to the beam. This location or displacement of the aircraft with respect to the beam does not provide an indication of the heading which the aircraft should fly in order to effectively intercept and track the beam. In using conventional omni or localizer presentation on a cross pointer indicator, the vertical indicator must be mentally combined with several variables including the magnetic bearing of the beam, the distance from the transmitter, the drift angle due to crosswinds and the heading of the aircraft with respect to the bearing of the beam. From these continually changing variables, the pilot must approximate a series of headings and try to anticipate changes in headings for effective beam interception and tracking.

Efforts to provide computers which will present to the pilot, either human or automatic, a stabilized heading reference to be followed in order to intercept and track the beam have resulted in expensive and heavy equipment. Simplified versions of these computers have not been satisfactory. Computers of reasonable complexity and weight have suffered with limitations of range from the transmitter, displacement from the beam, or damping characteristics to the extent that no satisfactory course director for aircraft has heretofore been developed within reasonable cost and weight limitations.

A major object of this invention is to provide an aircraft course director to present a stabilized heading reference when the aircraft is approaching the beam at any practical distance from the transmitter and any practical radial displacement from the beam.

Another object of the invention is to provide a relatively simplified course director for aircraft which has improved damping characteristics and can be relied upon under all practical conditions of crosswinds and turbulence to present a stabilized heading reference which, if followed, will effectively intercept and track the radio beam.

In the attainment of these objects, one feature of the invention resides in the method of tracking a radio beam by comparing the displacement of the heading of the aircraft from the bearing of the beam and the displacement of the aircraft from the beam while modifying one of the displacements by a proportionality factor varying with the period of changes in the displacements.

Another feature of the invention resides in the method of intercepting the beam by flying the aircraft at a heading in a direction to intercept the beam until the displacement of the aircraft with respect to the beam is less than a selected maximum, then flying the aircraft along a course determined by comparing the displacement of the aircraft heading from the bearing of the beam to the displacement of the aircraft from the beam while modifying one of the displacements by a proportionality factor varying according to the displacement of the aircraft from the beam until said displacement from the beam reaches a preselected minimum, and then flying the aircraft along a course determined by comparing the displacement of the heading of the aircraft from the bearing of the beam and the displacement of the aircraft from the beam while modifying one of the displacements by a proportionality factor varying with the period of changes in the displacements.

Further, in the attainment of the aforementioned objects, another feature of the invention resides in the computer which responds to signals corresponding to the displacement of the aircraft from the beam and the displacement of the aircraft heading from the bearing of the beam for modifying one of the signals by a proportionality factor varying according to the period of changes in that signal and comparing the modified signal with the other signal to produce an error signal corresponding to the displacement of the heading of the aircraft from the heading of the aircraft necessary to navigate the desired course. This error signal, when applied to a cross pointer indicator, indicates to the pilot the displacement of the aircraft heading from the heading he should fly in order to intercept and track the beam. By a suitable coupling, this same error signal may be used to control an automatic pilot and direct the aircraft along a course to intercept and track the beam.

Still another feature of the invention resides in a computer for producing a modified heading signal which includes an inverse feedback amplifier actuated according to the displacement of the heading of the aircraft from the bearing of the beam and including a phase-lag network to produce an output signal corresponding to the heading displacement from the bearing of the beam modified by a factor varying inversely according to the period of changes in the displacement of the aircraft heading from the bearing of the beam. Preferably, the phase-lag network is a resistor condenser circuit having a time constant within the range of 6 to 25 seconds and, preferably, a time constant of approximately 15 seconds.

Other objects, advantages and features of the invention will become apparent from the following specification taken in conjunction with the accompanying drawings wherein:

Figure 5 is an electrical schematic diagram showing a specific embodiment of the system of Fig. 4.

Consideration of the problems involved in directing the plane to a given radio beam indicates that there are actually three separate problems to be solved. First, as an initial condition, the pilot must know in which direction to turn to fly toward the beam. Second, after the direction of turn has been established, a curved flight path must then be established to enable the plane to approach the beam asymptotically at some practical distance from the transmitter. Third, once the plane has captured the beam the course director must operate in a manner which maintains the plane in flight along the beam. Each of these three problems is separate from the others and a desirable solution for one of the three problems is not always consistent with a desirable solution for the others. Further, a desirable solution of one of the problems under a given set of conditions may be extremely undesirable when different conditions are present.

Figure 1:
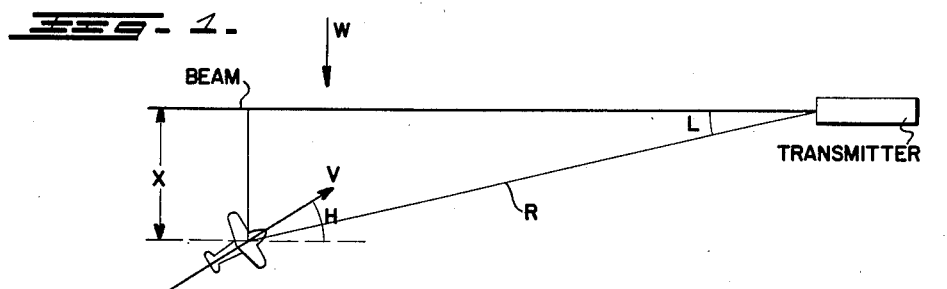
Figure 1 is a schematic diagram illustrating the factors involved in solving the flight path equation.

The various factors which enter into solutions of these problems are illustrated in Fig. 1. The angle L is the lateral track position angle between the radio beam and a straight line joining the transmitter and the airplane position. The angle H is the heading displacement from the bearing of the beam and is measured between a line extending along the fore and aft axis of the airplane and a line parallel to the beam. X is the perpendicular or radial distance from the beam to the airplane position. V is a vector representing the speed of the airplane. R is the range or distance from the plane to the transmitter.

Assuming small angles so that sine $L=L$, sine $H=H$, and that R is essentially constant from Fig. 1, it can be seen that:

(1) $X=LR$ (2) $\dot{X}=R\dot{L}=W-VH$ ($W=X$ component of wind)

(3) $H=\frac{W}{V}-\frac{\dot{X}}{V}$ (4) $\dot{H}=-\frac{\ddot{X}}{V}$

The signal derived in a well known manner from the radio beam is proportional to L, the proportionality factor differing depending on whether the plane is flying on omni or localizer. Since the compass bearing of the desired radio beam is known to the pilot, it is a simple matter to compute the heading H of the airplane with respect to the beam. By establishing a dynamic relationship between the measured quantities H and L, a curved flight path of the desired form may be established. Since the heading H is at all times under the control of the pilot, the established relationship may be such that when (5) $L=FH$ the plane is flying a heading H which is tangential at any given instant to the desired curved flight path. The term F in Equation 5 is not always constant and represents the relative weight to be given to the terms H and L. It will be defined as a function or proportionality factor which is determined by conditions hereinafter explained.

Referring to the initial problem mentioned above, namely that of initially indicating to the pilot which direction the plane must be turned to intercept the beam, a desirable initial heading H must be large enough so that the plane will intercept the beam at a practical distance from the transmitter. At the same time, the heading H should not be greater than 90° since this would cause the plane to begin to fly away from the transmitter. The actual H signal derived varies as the sine of H in order to generate a signal of a positive or negative sign depending upon which side of the beam the plane is on. Since the value of the H signal reaches a maximum positive value at 90° and a maximum negative value at 270°, it will be seen that if the proportionality factor F is small there is a possibility that the indicated equality of Equation 5 cannot be obtained at small values of F because the H signal is limited. If the maximum FH signal can never get large enough to balance out the L signal, the computer will continuously call for an increased heading and thus cause the plane to fly in a circle at a position widely displaced from the desired radio beam.

While this state of events is normally undesirable, there is a situation where this feature may be put to a practical use. This occurs when the pilot initially actuates the course director at some position where L is approaching 90°. In such a case, the flight path established by the course director would intercept the beam so close to the transmitter that the pilot would not have a chance to make a satisfactory approach to the landing strip. When the aircraft is positioned so the value of L is quite large, it may be desirable to direct the plane into a circular path in order to notify the pilot of his relative position with respect to the beam and transmitter. Therefore, in considering the initial problem of directing the plane toward the beam, it is seen that the proportionality factor F should be less than 1 in order to intercept the beam at a practical distance from the transmitter, but more than the selected maximum practical value of L divided by the maximum possible value of H.

The foregoing discussion has been directed only to the initial considerations involved in indicating to the pilot the direction in which the plane must be turned to fly toward the beam. In general, in this situation the value X in Figure 1 will be quite large. In such a situation, a desirable flight path to the beam may be initially established at some value of H, roughly speaking, between 60 and 90°. The actual value of H for relatively large values of X is not especially critical. As the plane begins to approach the beam, it becomes desirable to establish a curved flight path to intercept the beam tangentially.

While the effect of crosswind is not of any great importance at the large displacements from the beam, the heading H of the aircraft must be selected to direct the aircraft toward the beam whether the effect of crosswind moves the aircraft toward or away from the beam. Crosswind effect on the course of the aircraft increases in importance as the plane approaches the radio beam and some form of crosswind compensation is essential. The curved flight path must take into account the effect of crosswind so that the aircraft will be directed along a path to intercept the radio beam even in the presence of a crosswind of any practical magnitude, regardless of the direction of the crosswind.

To offset the effect of crosswind, it is necessary for the plane to "crab" along a flight path so that a component of velocity perpendicular to the flight path is established in order to balance out the component of crosswind perpendicular to the flight path. Since the offset heading of the plane with respect to the definite heading of the radio beam or curved flight path will generate an error signal, it is necessary to fly the plane along a path which is angularly offset from the radio beam or desired flight path in order that an L signal will be generated to balance out the error signal due to the offset heading FH. If the term F in Equation 5 is large, the value of L required to balance out a given H due to crosswind is increased. However, once the plane has captured the beam, a large value of F would be desirable so that minor short term L displacement signals would be balanced by relatively small corrective heading signals.

Thus, in a course director operating upon the equality $L=HF$ the proportionality factor F should be operated on in the following manner. For large displacements of the plane from the beam a proportionality factor F should be less than 1, but large enough to prevent the plane from being directed into a circular flight path for all initial values of L up to a preselected maximum. Where the distance from the plane to the beam is small, the value of the proportionality factor F should be small in order to obtain proper compensation for crosswind effects to allow the plane to fly along a path where a small L signal will balance the H signal generated by the offset heading required to compensate for crosswind. On the other hand, the value of F should be relatively large in order that the computer may "ignore" short term disturbances such as slight variations in the beam or momentary inattention on the part of the pilot.

One convenient way of indicating the values of L and FH to the pilot is to apply or compare the quantities L and FH upon an indicator which indicates the algebraic sum of the two quantities. By modifying the heading H of the aircraft to maintain the indicator upon zero, the pilot automatically directs the plane along the desired flight path. Since the proportionality factor F is merely a mathematical term representing the relative weight given to the terms H and L, this factor may be varied by operating upon either of the input quantities L and H before applying them to the indicator.

As noted above, the initial problem is to direct the plane toward the beam and, from the discussion above, where the initial value of L is of some magnitude, the "value" of F should be increased. Since this consideration holds true mainly for large values of L, the "value" of F under these conditions may be increased by attenuating the higher values of L which are applied to the indicator. In Equation 5, attenuating L is the equivalent of amplifying H and therefore the effect of attenuating L is to increase the proportionality factor F for higher values of L.

As the plane approaches the beam, the effect of crosswind becomes increasingly important. To obtain the maximum amount of crosswind compensation, the "value" of the proportionality factor F should be a minimum. However, this "value" of F must also be such that the plane will approach the beam in at least an approximation of a tangential curve. If the "value" of F is small at a time when L has an effective signal, a large input of H would be required to balance out the L signal. The increased value of H would cause the plane to turn more directly toward the beam at the expense of a tangential approach. Therefore, while the "value" of F may be made quite small when L is, let us say, a fraction of a degree, the "value" of F should remain reasonably large in the region where L is approximately 4 or 5 degrees. In other words, the "value" of F which is reasonably large for large values of L should be decreased as the value of L decreases. This may be accomplished by subtracting a constant amount C from the H signal before applying the signal to the indicator. Operating on H in this manner, the indicator will be on zero when (6) $K_2L = H - C$ where the terms on either side represent the actual signals due to L and H which are applied to the indicator and $K_2$ is a factor applied to the L signal by the radio receiver.

The change of the proportionality factor F which is accomplished by this process may be best appreciated by consideration of the following table A where it is assumed that $K_2 = 8$ and $C = 18°$.

TABLE A

| L | $K_2L = H-C$ | | H | $F = \frac{L}{H}$ | $F' = \frac{K_2L}{H}$ |
|---|---|---|---|---|---|
| 4° | 32 | 32 | 50° | .080 | .64 |
| 2° | 16 | 16 | 34° | .059 | .47 |
| 1° | 8 | 8 | 26° | .038 | .30 |
| ½° | 4 | 4 | 22° | .023 | .18 |
| ¼° | 2 | 2 | 20° | .0125 | .1 |

Figure 2:
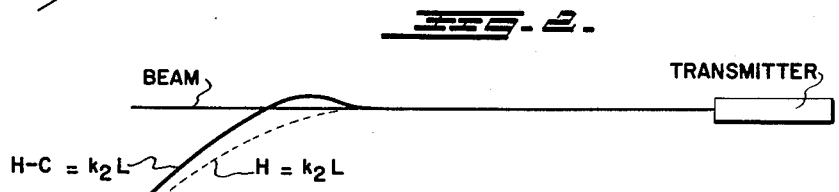
Figure 2 is a schematic diagram illustrating two different flight paths.

It will be noted that the effect of subtracting the constant C from the H input is to cause the plane to follow a flight path which approaches the beam more directly by an angle C. This may be best appreciated by reference to Figure 2. In this figure, the hidden line curve designated H equals $K_2L$ represents the path which the plane would follow if the constant C were not subtracted from the H input at the indicator. Due to the presence of the term C, the plane actually flys the full line path which is a somewhat direct approach to the beam. As indicated from the table above, the plane will follow a curved approach path which is not exactly tangential to the radio beam but instead intercepts the radio beam at an angle of approximately 20°.

Even in the absence of crosswind, an overshooting of the beam is not especially undesirable. Psychologically, the pilot is somewhat relieved to find that he has at last reached the beam and due to considerations which will be discussed below, the course director will normally enable the plane to recapture the beam with no more than one overshoot.

As a practical matter, crosswind effect is nearly always present. When the crosswind component is such as to oppose the plane's approach to the beam, the crosswind acts to reduce or substantially eliminate the overshoot discussed above. When the crosswind effect is directed in the opposite direction, the initial overshoot is increased. However, the computer acts to direct the plane back to the beam and its approach to the beam from the opposite side is then opposed by the crosswind, again substantially eliminating the overshoot.

The foregoing discussion has been largely devoted to the problem of enabling the plane to capture the beam. In the case where the plane is flying along the beam, an apparent paradox is present. In order to maintain a high degree of compensation for crosswind, the "value" of F in Equation 5 should be maintained at a minimum value in order that the product of the heading signal H generated by the offset heading of the plane from the desired flight path and F may be balanced out by the minimum displacement signal L. However, under certain conditions, it is extremely desirable to have the proportionality factor F maintained at a large "value" when the plane has captured the beam. For example, deviations of the beam from a theoretical straight line present short term disturbances in the signals supplied to the computer or some condition may cause the aircraft to momentarily shift from the desired heading.

Assuming that the plane is flying along the beam, a small deviation of the beam will generate a small L signal which will be applied to the indicator. If the proportionality factor F is small, a large heading correction H will have to be applied to balance out the small L signal. This is undesirable since it would require several sharp maneuvers to recapture or follow the beam. A similar situation applies when the pilot inadvertently wanders off the beam by some small amount or the aircraft suddenly "yaws" so the heading must be changed to maintain a course along the beam.

The maintenance of a small proportionality factor F to adequately compensate for crosswind while at the same time providing a large proportionality factor F to allow the course director to "ignore" minor deviations from the beam may be accomplished by noting that the error due to wind is of long term duration while the minor deviations in the beam are of relatively short term duration. As seen above in the discussion of the manner of decreasing the value of the proportionality factor F as L decreases, the proportionality factor may be decreased by subtracting from the H input an increasing percentage of the H input. This method of operating upon the proportionality factor may also be employed in the situation where the plane has captured the beam. One method of doing this is to feed back a proportion of the incoming H signal to oppose the incoming H signal. By operating upon the proportion of the feed-back signal by some factor involving time, the proportion of the feed-back to the input may be increased over a period of time to make the proportionality factor F small for long term inputs while maintaining F relatively large for short term inputs.

It will be noted that, with the exception of the initial attenuating of the L input to the indicator, the proportionality factor has been operated on by operating on the H input before the H input appears upon the indicator. Similar results may obviously be obtained by operating upon the L input in an inverse manner.

Figure 4:
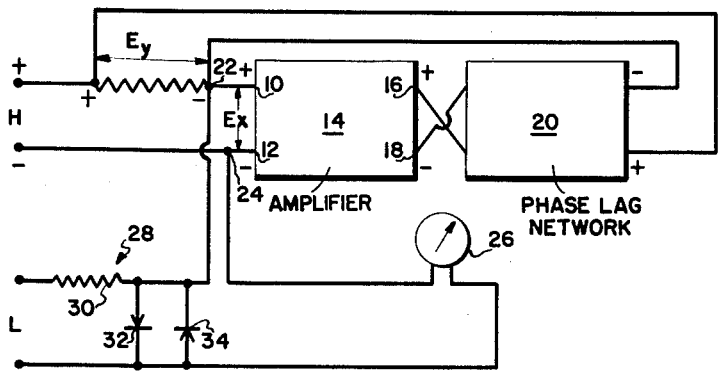
Figure 4 is a schematic block diagram of one type of course director.

In the course director system shown in Fig. 4, the H input is applied across the input terminals 10 and 12 of an amplifier 14. Amplifier 14 has a limiter on its input circuit whereby the input to the amplifier, and therefore its output at terminals 16 and 18, is limited to a predetermined maximum value. This output is applied through an inverse feed-back loop including a phase-lag network 20 having a time constant $\tau$. A modified value of H corresponding to the actual H input minus the inverse feed-back voltage $E_y$ appears at terminals 22 and 24 and is added algebraically to the L input with the sum appearing on indicator 26 to indicate the error signal corresponding to the displacement of the aircraft heading from the heading necessary to intercept and track the beam. The L input is attenuated by applying it to the terminals of a voltage attenuating network 28 including a resistor 30 in series and a pair of oppositely disposed germanium crystal rectifying elements 32 and 34. This network reduces or attenuates the beam displacement signal L when the aircraft is displaced from the beam more than about 20°.

Figure 3:
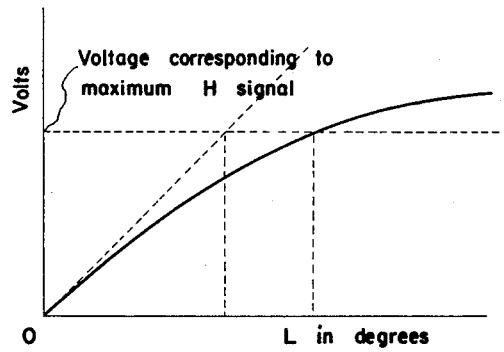
Figure 3 is a graphical plot showing the relationship of the displacement voltage signal generated to the displacement of the airplane from the beam.

The effect of this attenuating network may be best appreciated by reference to Fig. 3. In this figure, a plot of L in angular measure against the voltage signal generated shows that for small values of L the signal generated is a direct portion of the value of displacement of the aircraft from the beam in degrees or radians. This is due to the characteristic of germanium crystals which become conductive only when the applied voltage exceeds a certain minimum. After the voltage exceeds this threshold, the conductivity of the crystals varies so the output signal is attenuated according to the curve shown in Fig. 3. From this curve, it can be seen that with the arrangement employed, the value of L corresponding to the maximum H signal is increased over that which would apply if a straight line relationship existed.

The limiter on amplifier 14 is more fully described below and is saturated for all inputs greater than a predetermined value. Assuming a long term H input, over the range wherein the input to amplifier 14 is greater than the saturation value, the amount of inverse feedback which is obtained from the output of amplifier 14 remains at a constant value so the modified H signal at terminals 22 and 24 corresponds to the input H from which a constant C is subtracted to effectively decrease the proportionality factor F during the approach in the manner discussed above.

Phase lag network 20 is employed to enable the course director to distinguish between short and long term disturbances or changes in the H input signal. Essentially, the phase lag network delays the feed-back voltage and, by the choice of a suitable time constant for the phase lag network, a short term input of H appears directly upon indicator 26 before the output of amplifier 14 has worked through the phase lag network to oppose the H input. Thus, for short term errors, the H signal which appears upon the indicator has not been attenuated by the inverse feed-back and the proportionality factor F remains relatively large. For H inputs of increasing time duration, an increasing output is obtained from the phase lag network and this output is subtracted from the H input which represents the true heading of the aircraft. Thus, the longer the time duration of an H input, the greater the amount of feed-back subtracted from the input and the smaller the value of proportionality factor F. Hence the proportionality factor varies inversely with the period of the change in input signal or disturbance.

The above described arrangement provides an improved damping characteristic to smooth out the overshooting occasioned in the actual approach to the beam. The manner in which damping is provided may be best understood from a consideration of the differential equation of the performance of the course director.

In the following discussion L and H will be assumed to be small enough to allow the use of the approximations sine $H=H$, sine $L=L$ and cosine $L=1$. Range R will be assumed to remain essentially constant. From a consideration of Fig. 4, if the amplification factor of amplifier 14 is $K_1$, the feedback voltage $E_y$ is (7) $$E_y = \frac{K_1}{1+\tau} E_x$$

when $p$ represents the time derivative $d/dt$, $\tau$ is the time constant of phase-lag network 20 and $E_x$ is the input voltage. By letting $K_2L$ represent an electrical signal proportional to beam displacement angle L and letting H represent the signal corresponding to the heading displacement angle H, from Fig. 4 it can be seen that indicator 26 will indicate zero when (8) $K_2L - E_x = 0$. Also from Fig. 4 it is apparent that (8a) $E_x = H - E_y$. By substitution in Equation 7 above (9) $$E_x = \frac{H}{1 + \frac{K_1}{1+\tau_p}}$$

Substituting this value of $E_x$ in Equation 8

(10) $$K_2L = \frac{(1+\tau_p)H}{1+K_1+\tau_p}$$

which may be written in differential form as

(11) $$(1+K_1)K_2L + \tau K_2\dot{L} = H + \tau \dot{H}$$

where $\dot{H}$ and $\dot{L}$ represent the derivatives $$\frac{dH}{dt} \text{ and } \frac{dL}{dt}$$

resulting from the operation of $p$ on H and L.

Substituting in the above equation the equalities in Equations 1 through 4,

(12) $$(1+K_1)K_2\frac{X}{R} + \tau K_2\frac{\dot{X}}{R} = \frac{W - \dot{X} - \ddot{X}\tau}{V}$$

and rearranging the terms in Equation 12

(13) $$\ddot{X} + \left(\frac{K_2V}{R} + \frac{1}{\tau}\right)\dot{X} + \left(\frac{K_2(1+K_1)V}{\tau R}\right)X = \frac{W}{\tau}$$

the complementary solution of this equation is of the form

(14) $$X = Ae^{-\frac{1}{2}\left(\frac{K_2V}{R}+\frac{1}{\tau}\right)t} \cos\left[\left(K_2\frac{(1+K_1)V}{\tau R} - \frac{1}{4}\left(\frac{K_2V}{R}+\frac{1}{\tau}\right)^2\right)^{1/2} t + \phi\right]$$

where A and $\phi$ are constants depending upon the initial conditions.

From Equation 14 above, the natural frequency is given by

(15) $$F_n = \frac{1}{2}\left[K_2\frac{(1+K_1)V}{\tau R} - \frac{1}{4}\left(\frac{K_2V}{R}+\frac{1}{\tau}\right)^2\right]^{1/2}$$

As a simplifying approximation, the term $$-\frac{1}{4}\left(\frac{K_2V}{R}+\frac{1}{\tau}\right)^2$$

under the radical may be neglected and rewriting the natural frequency as

(16) $$F_n = \frac{1}{2}\left[K_2\frac{(1+K_1)V}{\tau R}\right]^{1/2}$$

the damping ratio may be calculated to be

(17) $$\frac{C}{C_c} = \frac{1}{2\sqrt{K_2(1+K_1)}}\left[K^2\sqrt{\frac{\tau V}{R}} + \sqrt{\frac{R}{\tau V}}\right]$$

The particular solution of (14) involves the addition to the right hand side of Equation 14 of the term $$\frac{WR}{K_2(1+K_1)V}$$

giving a solution when the transient term in Equation 14 has become insignificant of

(15) $$X=\frac{WR}{K_2(1+K_1)V}$$

recalling that (1)

$$L=\frac{X}{R}$$

(16) $$L=\frac{W}{K_2(1+K_1)V}$$

Thus, the steady state wind error, which represents the angle L which must be maintained to compensate for wind, varies as the ratio of the X component of the wind velocity to the airplane velocity. An appreciation of its magnitude may be gained by substituting typical values in the above relationship. Assuming $K_2$ equals 8, $K_1$ equals 9, an aircraft velocity of 200 ft. per second and a wind component of 50 ft. per second, the wind error will be represented by an angle L equal to .00313 radians or less than 0.2 of a degree. This represents a wind error of approximately 15 ft. at a distance of one mile from the transmitter.

As seen from Equation 14, the radial displacement X of the plane from the beam, when plotted against time, is represented by a decaying cosine function. An appreciation of the amount of overshoot may be gained from a consideration of the following Table B where again $K_2$ equals 8, $K_1$ equals 9, aircraft velocity V equals 200 ft. per second and the time constant will be assumed 8 seconds.

TABLE B

| R (ft.) | $F_n$(cycles) sec. | $T_n/2$ (sec.) | $\frac{C}{C_e}$ |
|---|---|---|---|
| 5,000 | .1 | 5 | .35 |
| 10,000 | .071 | 7.05 | .32 |
| 20,000 | .05 | 10.0 | .32 |
| 40,000 | .035 | 14.1 | .37 |

The magnitude of the overshoot is dependent upon the initial amplitude or displacement A and the instantaneous value of the e function in Equation 14. Recalling that Equation 14 has been written in terms of small L and H and that the phase lag network does not begin to exert influence on the approach flight path until L is very small, it is seen that the initial amplitude term A in the above equation will not be extremely large. Assuming only for the sake of illustration that the range term remains essentially constant at 20,000 ft. the amplitude, due to the decaying e term in Equation 14 after 10 seconds will be approximately 1/100 of the original amplitude. From the foregoing table it will be noted that when R is 20,000 ft. the half period is in the order of 10 seconds and thus, at this range the amplitude of oscillation has been reduced by a factor of 100 during one-half period.

Further analysis of the foregoing table shows that a reasonable amount of damping is maintained at all ranges. This is because the damping ratio, that is the ratio of the actual damping to critical damping is dependent upon a direct range term and an inverse range term. In actual practice, it can be shown that for values of range below 5,000 ft., the damping ratio increases quite rapidly, its value at 1,000 ft. being approximately .62.

One form of the inverse feedback amplifier which may be used for modifying the heading displacement voltage is illustrated in Fig. 5. As shown in that figure, the heading displacement signal is derived from a gyro autosyn system 101 to produce an A.C. voltage varying in phase and magnitude according to the deviation of the heading of the aircraft from a selected heading preset into the system and corresponding to the definite heading of the radio beam. This voltage is supplied through resistor 102 to grid 103 of cathode follower 104, the output of which is supplied through transformer 105 to grid 106 of limiting amplifier 107. Limiting amplifier 107 is designed to saturate for a given input voltage. As will hereinafter appear, the inverse feedback amplifier system is designed to saturate for a heading displacement signal corresponding to about 20° of displacement of the heading of the aircraft from the definite heading of the radio beam. By reason of the over-all gain of about nine and the inverse feedback connection, the gain of the system is approximately one-tenth so the limiting amplifier 107 will saturate for an input voltage at grid 103 of cathode follower 104 corresponding to a certain heading displacement signal.

The output of limiting amplifier 107 is applied through transformer 108 to a discriminator circuit where it is compared with a reference voltage from an A.C. source 109 supplied through transformer 111 so the output of the discriminator across resistors 112 and 113 is a D.C. voltage varying in polarity and magnitude according to the phase and magnitude of the input A.C. voltage which, in turn, corresponds to the direction and amount of the heading displacement signal. This D.C. voltage varying in polarity and magnitude according to the direction and magnitude of the heading displacement of the aircraft, is supplied to a phase-lag network consisting of a sizeable condenser 114 and resistors 115 and 116, the values of which are so selected that the phase-lag network has a time constant of between six and twenty-five seconds and, preferably, approximately fifteen seconds. Thus, the output of the phase-lag network is a D.C. voltage corresponding to the direction and magnitude of the heading displacement signal as modified by a factor corresponding to the period of changes in the heading displacement signal. This D.C. voltage is used to modulate an A.C. voltage supplied from the same source 109 through condenser 117 to the grids 118 and 119 of tubes 121 and 122 connected in a balanced modulator circuit to produce an A.C. output voltage at transformer 123 corresponding in phase and magnitude to the direction and magnitude of the input voltage as modified by a factor corresponding to the period of changes in the input voltage. This output voltage is supplied by transformer 123 across resistor 102 so it is fed back along with the input heading displacement signal to grid 103 of cathode follower 104. Since the feedback is degenerative and opposes the input heading displacement voltage, the overall gain of the inverse feedback amplifier is about 0.1.

The output of the inverse feedback amplifier is taken from the cathode follower 104 through a transformer 128 to a discriminator where it is compared with an A.C. voltage from a source 129 corresponding to the source 109 to produce at output terminals 131 a D.C. voltage varying in polarity and magnitude according to the heading displacement signal as modified by a factor varying according to the period of changes in the heading displacement signal for those conditions where the limiting amplifier 107 is not saturated. Where the heading displacement signal exceeds a certain value and amplifier 107 is saturated, the output voltage at terminals 131 corresponds to the difference between the heading displacement signal and a fixed constant determined by the overall gain of the amplifier. Where the gain of the amplifier is nine, and the heading displacement signal exceeds the saturating value, the modified heading displacement voltage appearing at terminals 131 corresponds to the input heading displacement voltage minus a constant voltage.

The beam displacement signal is supplied in the form of a D.C. voltage corresponding in polarity and phase to the direction and magnitude of the displacement of the aircraft from the radio beam. This beam displacement voltage may be supplied to terminals 133 of a summing network so the modified heading displacement signal may be applied across resistor 134 to be subtracted from the beam displacement signal and produce an error signal across pointer meter 135 corresponding in polarity and magnitude to the direction and magnitude of the displacement of the heading of the aircraft from the necessary aircraft heading to navigate the aircraft on the desired course. The beam displacement signal supplied to terminals 133 is attenuated when the beam displacement is large as already described. This attenuation is accomplished by a network including a pair of crystal rectifiers 141 and 142 connected in an opposed parallel network and in series with resistor 143.

In a typical installation, for approach to a runway by intercepting and tracking a localizer, where the aircraft is originally displaced more than 4° or 5° from the beam, the radio beam displacement signal as attenuated corresponds to a displacement of about 4° or 5°. In the case of the localizer receiver, the summing network for computing the difference between the beam displacement signal and the modified heading displacement signal establishes constants weighting the beam displacement signal by a factor of about eight with respect to the modified heading displacement signal. For a beam displacement greater than 4° or 5°, the heading displacement will be greater than 20°, so the modified heading displacement voltage will be a voltage corresponding to a heading between 50° and 60° to match the attenuated beam displacement signal of 4 to 5 degrees. Thus, where the displacement from the beam exceeds 4° or 5°, the aircraft will fly an approximately straight line toward the beam at a heading displacement of about 50° with respect to the beam. In the zone from about 4° of beam displacement to about ¼° beam displacement, the limiting amplifier 107 is saturated, assuming that the aircraft is piloted with zero error across the indicator 134. Under these conditions, the weighting factor of eight in the comparing circuit means that, for a beam displacement of ¼°, the heading displacement must be about 20° because the modified heading displacement voltage would then be 20° less 18° or 2° which an eight-to-one factor would balance against ¼° for the beam displacement voltage. In other words, the beam displacement voltage modified by the factor of 8 is compared with a heading displacement voltage modified by a factor F' varying from about 0.64 to 0.1 (Table A) with the displacement of the aircraft from the beam within the range of 4° to ¼°. When the beam displacement is less than ¼°, the 0.1 factor, based upon the beam displacement, remains essentially constant but the phase-lag network of the inverse amplifier introduces another variable proportionality factor. While the aircraft is within ¼° of the definite bearing of the beam, the error signal at the cross pointer meter 134 is the difference between the beam displacement signal and the heading displacement signal as modified by a factor varying according to the period of changes in the heading displacement signal. Thus, the modified heading voltage depends upon the output of the phase-lag network and is varied according to the period or time constant of changes in the heading displacement voltage fed into the inverse feedback amplifier.

Operation of the system on signals from an omni receiver is much the same except that the relationship of the values of L and H is modified by a factor of about 4 due to the difference in the outputs of the ILS and omni receiver. This results in a change in the zones of beam displacements where the limiters and attenuators are effective. Thus, the value of L is attenuated in the range of 15° to 20° and the limiting amplifier is effective to limit the value of H to balance a signal from the omni receiver corresponding to a beam displacement of about 1°. Since the omni signal L is a function of radial displacement, the larger omni signal will override any value of the heading signal H when an interception of the beam is not practical. Attenuator network 141—143 permits a solution of the approach problem for larger radial displacements from the beam, but prevents an attempted approach where there is no reasonable solution. The effect of this is to minimize the heading correction required for disturbances or deviations having a time constant short compared to the 15 seconds time constant of the RC phase-lag network.

While I have described a specific embodiment of my invention, it will be apparent to those skilled in the art that the disclosed embodiment is capable of modification. Therefore the foregoing description is to be considered exemplary rather than limiting and the true scope of my invention is that defined by the following claims.

I claim:

1. The method of directing an aircraft to a radio beam having a definite bearing which comprises flying the aircraft at a heading in a direction to intercept the beam until the displacement of the aircraft with respect to the beam is less than a selected maximum displacement, then flying the aircraft along a curved course determined by comparing the displacement of the aircraft heading from the definite bearing of the beam to the displacement of the aircraft from said beam while modifying one of said displacements by a proportionality factor varying according to the displacement of the aircraft from the beam until said displacement from the beam reaches a preselected minimum, and then flying the aircraft along a course determined by comparing the displacement of the heading of the aircraft from said bearing and the displacement of the aircraft from said beam while modifying one of said displacements by a proportionality factor varying with the period of changes in said displacements.

2. The method of directing an aircraft to a radio beam having a definite bearing which comprises flying the aircraft at a heading in a direction to intercept the beam until the displacement of the aircraft with respect to the beam is less than a selected maximum displacement, then flying the aircraft along a curved course determined by comparing the displacement of the aircraft from the beam with the displacement of the aircraft heading from the definite bearing of the beam while modifying said heading displacement by a proportionality factor diminishing as the aircraft approaches the beam until the beam displacement reaches a selected minimum, and then flying the aircraft along a course within said minimum displacement from the beam determined by comparing the displacement of the aircraft from the beam with the displacement of the heading of the aircraft from said bearing while modifying said heading displacement by a proportionality factor varying inversely with the period of changes in said heading displacement.

3. The method of directing an aircraft to track a radio beam having a definite bearing which comprises flying the aircraft along a course by comparing the displacement of the heading of the aircraft from the definite bearing and the displacement of the aircraft from the beam while modifying one of said displacements by a proportionality factor varying with the period of changes in said one displacement.

4. The method of directing an aircraft to track a radio beam having a definite bearing which comprises flying the aircraft along a course by comparing the displacement of the heading of the aircraft from the definite bearing and the displacement of the aircraft from the beam while modifying said heading displacement by a proportionality factor varying inversely with the period of changes in said heading displacement.

5. A course director for use in navigating an aircraft on a course toward and along a radio beam having a definite bearing comprising receiving means for a signal corresponding to the displacement of the aircraft from the beam, receiving means for a signal corresponding to displacement of the aircraft heading from the bearing of the beam, modifying means actuated by one of said receiving means for modifying one of said signals by a proportionality factor varying according to the period of changes in said one signal received by said one receiving means, and means actuated by the other receiving means and by said modifying means for subtracting the other of said signals from the modified signal to produce an error signal corresponding to the displacement of the heading of the aircraft from the heading of the aircraft necessary to navigate the desired course.

6. A course director for use in navigating an aircraft on a course toward and along a radio beam having a definite bearing comprising means for receiving a signal corresponding to displacement of the aircraft heading from the bearing of the beam, modifying means actuated by one of said receiving means for modifying one of said signals by a proportionality factor varying according to the period of changes in signals received by said one means and including a limiter rendering said modifying means ineffective until the signal from said one receiving means diminishes below a predetermined maximum, and means actuated by the other receiving means and by said modifying means for subtracting the other of said signals from the modified signal to produce an error signal corresponding to the displacement of the heading of the aircraft from the necessary heading to navigate the aircraft along the desired course.

7. A course director for use in navigating an aircraft on a course toward and along a radio beam having a definite bearing comprising first means for receiving a signal corresponding to the displacement of the aircraft from the beam, second means for receiving a signal corresponding to the displacement of the aircraft heading from the bearing of the beam, modifying means actuated by said second receiving means for modifying said heading displacement signal by a proportionality factor varying inversely according to the period of changes in the heading displacement signal received by said second means, and means actuated by said first means and by said modifying means for subtracting the beam displacement signal from the modified heading displacement signal to produce an error signal corresponding to the displacement of the heading of the aircraft from the heading necessary to navigate the aircraft on the desired course.

8. A course director for use in navigating an aircraft on a course toward and along a radio beam having a definite bearing comprising first means for receiving a signal corresponding to the displacement of the aircraft from the beam, attenuating means for decreasing the magnitude of the beam displacement signal for larger displacements from the beam, second receiving means for receiving a signal corresponding to the heading displacement of the airplane from the bearing of the beam, modifying means actuated by said second receiving means for modifying the heading displacement signal by a proportionality factor varying inversely according to the period of changes in the heading displacement signal received by said second means, and means actuated by said attenuating means and by said modifying means for subtracting the beam displacement signal up to the limited maximum from the modified heading displacement signal to produce an error signal corresponding to the displacement of the heading of the aircraft from the aircraft heading necessary to navigate the desired course.

9. A course director for use in navigating an aircraft on a course toward and along a radio beam having a definite bearing comprising first means for receiving a signal corresponding to the displacement of the aircraft from the beam, second means for receiving a signal corresponding to the displacement of the aircraft heading from the bearing of the beam, modifying means actuated by said second receiving means for modifying the heading displacement signal by a proportionality factor varying inversely according to the period of changes in said heading displacement signal received by said second means and including a limiter effective when said heading displacement means exceeds a predetermined maximum to cause the modifying means to produce a signal corresponding to the heading displacement signal plus a constant, and means actuated by said first means and said modifying means for subtracting said beam displacement signal from the modified heading displacement signal to produce an error signal corresponding to the displacement of the heading of the aircraft from the necessary aircraft heading to navigate the desired course.

10. A course director for use in navigating an aircraft on a course toward and along a radio beam having a definite bearing comprising first means for receiving a signal corresponding to the displacement of the aircraft from the beam, second means for receiving a signal corresponding to the displacement of the aircraft heading from the bearing of the beam, modifying means actuated by said second means for producing a modified heading displacement signal corresponding to said heading displacement signal plus a constant for values of heading displacement signal exceeding a predetermined maximum and corresponding to the heading displacement signal modified by a proportionality factor varying inversely according to the period of changes in the heading displacement signal for values of the heading displacement signal lower than said predetermined maximum, attenuating means actuated by said first receiving means for reducing the value of the beam displacement signal for larger displacement from the beam, and means actuated by said attenuating means and by said modifying means for subtracting said beam displacement signal from said modified heading displacement signal to produce an error signal corresponding to the displacement of the heading of the aircraft from the necessary aircraft heading for navigating the desired course.

11. A course director for computing the displacement of the aircraft heading from the heading necessary to navigate the aircraft on a desired course toward and along a radio beam having a definite bearing according to a beam displacement signal corresponding to the displacement of the aircraft from the beam and a heading displacement signal corresponding to the displacement of the aircraft heading from the bearing of the beam comprising an inverse feedback amplifier responsive to the heading displacement signal and including a phase-lag network for producing a heading displacement signal modified by a factor varying inversely according to the period of changes in the heading displacement signal, and means actuated by said amplifier and the beam displacement signal for subtracting the beam displacement signal from the modified heading displacement signal to produce an error signal corresponding to the displacement of the heading of the aircraft from the necessary heading to navigate the aircraft on the desired source.

12. A course director as defined in claim 11 wherein said phase-lag network comprises a resistance-capacitance network having a predetermined time constant.

13. A course director as recited in claim 12 where said phase-lag network has a time constant between 6 and 25 seconds.

14. A course director as recited in claim 12 where said phase-lag network has a time constant of 15 seconds.

15. In a course director for computing the displacement of the aircraft heading from the heading necessary to navigate the aircraft on a desired course toward and along a radio beam having a definite bearing, a computer for computing a modified heading signal comprising an inverse feedback amplifier, an input to said amplifier for supplying a signal corresponding to the displacement of the aircraft heading from the definite bearing of the beam, a phase-lag network in the feedback loop of said amplifier for producing a corrective signal varying inversely according to the period of changes in said supplied signal, and an output for supplying a modified heading signal corresponding to the difference between the input signal and the feedback signal from said network.

16. In a course director as recited in claim 15 wherein said phase-lag network includes a resistance and condenser having a time constant in the range from 6 to 25 seconds.

17. A course director for computing the displacement of the aircraft heading from the heading necessary to navigate the aircraft on a desired course toward and along a radio beam having a definite bearing according to a beam displacement signal corresponding to the displacement of the aircraft from the radio beam and a heading displacement signal corresponding to the displacement of the aircraft heading from the bearing of the beam comprising an inverse feedback amplifier responsive to the heading displacement signal and including a limiter and a phase-lag network for producing a modified heading displacement signal which for values exceeding a predetermined heading displacement signal corresponds to the sum of the heading displacement signal and a constant and for values of the heading displacement signal less than the predetermined heading displacement signal corresponding to the heading displacement signal modified by a factor varying inversely according to the period of changes in the heading displacement signal, and means actuated by said amplifier and the beam displacement signal for subtracting the beam displacement signal from the modified heading displacement signal to produce an error signal corresponding to the displacement of the heading of the aircraft from the heading of the aircraft necessary to navigate the aircraft on the desired course.

18. A course director as defined in claim 11 including means for attenuating beam displacement signals of a larger magnitude.

19. A course director as defined in claim 17 including means for attenuating beam displacement signals of a larger magnitude.

References Cited in the file of this patent

UNITED STATES PATENTS

| | | |
|---|---|---|
| 2,423,336 | Moseley | July 1, 1947 |
| 2,548,278 | Wirkler | Apr. 10, 1951 |
| 2,613,350 | Kellogg | Oct. 7, 1952 |
| 2,613,352 | Kellogg | Oct. 7, 1952 |